(12) United States Patent
Hering et al.

(10) Patent No.: US 11,789,166 B2
(45) Date of Patent: Oct. 17, 2023

(54) PULSE COUNTING COINCIDENCE CORRECTION BASED ON COUNT RATE AND MEASURED LIVE TIME

(71) Applicant: Aerosol Dynamics Inc., Berkeley, CA (US)

(72) Inventors: Susanne Vera Hering, Berkeley, CA (US); Gregory Stephen Lewis, Berkeley, CA (US); Steven Russel Spielman, Oakland, CA (US); Mark R. Stolzenberg, Minneapolis, MN (US)

(73) Assignee: Aerosol Dynamics Inc., Berkeley, CA (US)

( * ) Notice: Subject to any disclaimer, the term of this patent is extended or adjusted under 35 U.S.C. 154(b) by 114 days.

(21) Appl. No.: 16/911,368

(22) Filed: Jun. 24, 2020

(65) Prior Publication Data

US 2020/0408931 A1    Dec. 31, 2020

Related U.S. Application Data

(60) Provisional application No. 62/866,233, filed on Jun. 25, 2019.

(51) Int. Cl.
*G01N 15/02* (2006.01)
*G01T 1/17* (2006.01)
(Continued)

(52) U.S. Cl.
CPC ......... *G01T 1/171* (2013.01); *G01N 15/0205* (2013.01); *G01N 15/0211* (2013.01);
(Continued)

(58) Field of Classification Search
CPC ......... G01N 15/0205; G01N 154/1459; G01N 2015/025; G01T 1/171
See application file for complete search history.

(56) References Cited

U.S. PATENT DOCUMENTS

| | | | | |
|---|---|---|---|---|
| 3,949,197 A | * | 4/1976 | Bader | G01N 15/1227 377/50 |
| 5,247,461 A | * | 9/1993 | Berg | G01N 15/1031 73/865.5 |
| 9,297,737 B2 | * | 3/2016 | Trainer | G01N 15/0211 |

OTHER PUBLICATIONS

Lock, James and Edward Hovenac, An improved correction algorithm for number density measurements made with the Forward Scattering Spectrometer Probe, Review of Scientific Instruments Jun. 1989 60(6):1143.*

(Continued)

*Primary Examiner* — Rebecca C Bryant
(74) *Attorney, Agent, or Firm* — Vierra Magen Marcus LLP

(57) ABSTRACT

An approach for counting particles suspended in a flow of gas or liquid in instruments that direct the flow through an illuminated region. Pulses are detected when the signal is below a threshold amplitude and moves above the threshold amplitude. This movement above the threshold creates a dead time during which only one pulse is detected until the signal amplitude moves sufficiently below the threshold such that a subsequent particle creates a distinct pulse. After counting the number of pulses, and determining the measured live time that the signal is below the threshold value, an initial particle concentration is calculated, and the calculation corrected for coincidence by calculating an actual live time as a measured live time minus a constant multiplied by the number of distinctly counted pulses, where the constant has the units of time. From this, particle concentrations in a volume can be determined.

20 Claims, 14 Drawing Sheets

(51) Int. Cl.
  *G01T 1/172* (2006.01)
  *G01N 15/06* (2006.01)
  *G01N 15/14* (2006.01)
(52) U.S. Cl.
  CPC ....... *G01N 15/065* (2013.01); *G01N 15/1459* (2013.01); *G01T 1/172* (2013.01)

(56) References Cited

OTHER PUBLICATIONS

Hering, S.V., Stolzenburg, M.R., Quant, F.R., Oberreit, D.R. and Keady, P.B., 2005. A laminar-flow, water-based condensation particle counter (WCPC). Aerosol Science and Technology, 39(7), pp. 659-672.

Collins, A.M., Dick, W.D. and Romay, F.J., 2013. A new coincidence correction method for condensation particle counters. Aerosol Science and Technology, 47(2), pp. 177-182.

Hermann, M. and Wiedensohler, A., 2001. Counting efficiency of condensation particle counters at low-pressures with illustrative data from the upper troposphere. Journal of Aerosol Science, 32(8), pp. 975-991.

TSI (2016) Application Note CPC-001, Live Time Counting.

Takegawa, N. and Sakurai, H., 2011. Laboratory evaluation of a TSI condensation particle counter (Model 3771) under airborne measurement conditions. Aerosol Science and Technology, 45(2), pp. 272-283.

Willink, R., 2009. On dead-time corrections for estimating rates. Measurement Science and Technology, 21(1), p. 015101.

Zhang, Z. and Liu, B.Y., 1991. Performance of TSI 3760 condensation nuclei counter at reduced pressures and flow rates. Aerosol Science and Technology, 15(4), pp. 228-238.

Jaenicke, R. The optical particle counter: Cross-sensitivity and coincidence, Journal of Aerosol Science, 1972, vol. 3, pp. 95 to 111.

Wales, M. and Wilson, J. N., Theory of Coincidence in Particle Counters, Review of Scientific Instruments, vol. 32, Nr. 10, pp. 1132-1136. Oct. 1961.

Princen, L.H. and Kwolek, W. F., Coincidence Corrections for Particle Size Determinations with the Coulter Counter, Review of Scientific Instruments, vol. 36, No. 5, pp. 646-653 (1965).

Edmundson, I. C., Coincidence Error in Coulter Counter Particle Size Analysis, Nature, Dec. 1966, vol. 212, pp. 1450-1452.

\* cited by examiner

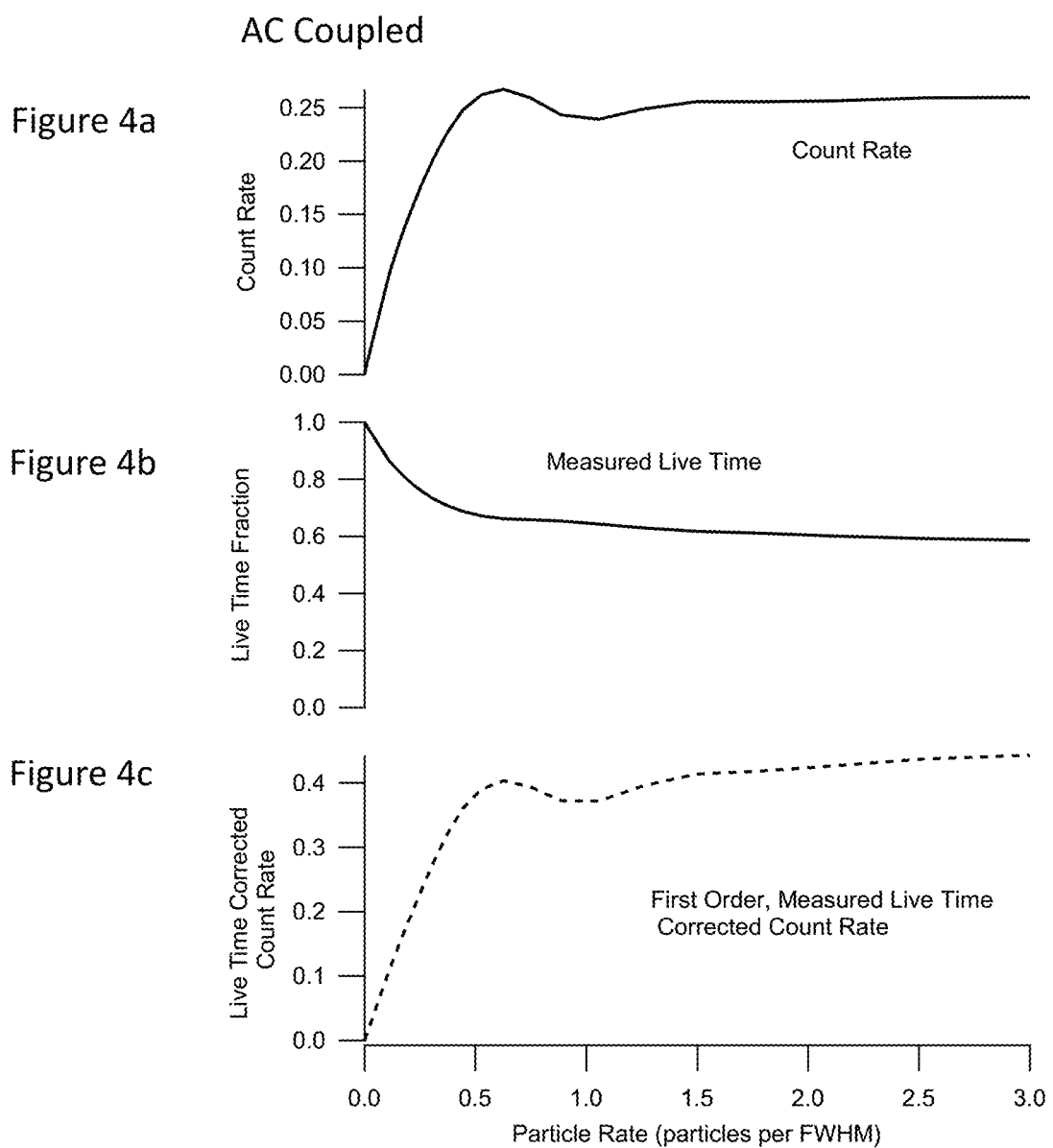

US 11,789,166 B2

PULSE COUNTING COINCIDENCE CORRECTION BASED ON COUNT RATE AND MEASURED LIVE TIME

CLAIM OF PRIORITY

This application claims the benefit of U.S. Provisional Patent Application No. 62/866,233, filed on Jun. 25, 2019.

FIELD OF THE INVENTION

This invention relates to the accurate counting of particles that pass through a light beam, as done in optical and condensation particle counters, wherein coincidence due to the simultaneous occurrence of multiple particles within the light beam leads to an under counting of the actual number of particles.

BACKGROUND

Particle counting systems, such as optical particle counters or condensation particle counters, measure particle number concentrations by passing particles through a light beam and detecting the number of distinct pulses of scattered light. Counting individual pulses is accurate when the number concentration of particles is relatively low, such that only one particle is present in the light beam at a time. For higher particle number concentrations, it is possible to have two or more particles within the sensing region at one time. This is referred to as coincidence, and the correction to obtain the true number of particles passing through the light beam from the number of distinctly detectable pulses is referred to as coincidence correction.

SUMMARY OF THE INVENTION

One general aspect includes a method for detecting particles, including: directing a flow of gas or liquid containing particles through a sensing region illuminated by a light source; detecting light scattered by the particles as they pass through the sensing region, the detecting including capturing a light intensity signal included of multiple pulses above a threshold level, each pulse including in indication of light scattered by one or more particles; counting distinct pulses during a measurement period, each distinct pulse the signal crossing from below the threshold level to above the threshold level; measuring a measured live time over the measurement period, the measured live time including a length of time the signal is below the threshold level; and outputting a coincidence-corrected value including number of particles that passed through the sensing region during the measurement period by dividing distinct pulses counted by a quantity including the measured live time minus a constant multiplied by the number of distinctly counted pulses, where the constant has the units of time.

Implementations may further include outputting a particle concentration based on coincidence-corrected value for the number of particles and the volume of air that passed through the sensing region during the measurement period. Implementations may further include the method wherein the value of the constant is determined by experiments in which data are collected over a range of particle concentrations with a pair of instruments, one of which acts as a reference. Implementations may further include the method wherein the reference instrument is operated at a constant dilution factor. Implementations of the described techniques may include hardware, a method or process, or computer software on a computer-accessible medium.

Another aspect includes a method for determining the number concentration of particles suspended in a gas or liquid by: directing a flow of gas or liquid containing particles through a sensing region illuminated by a light source; detecting light scattered by the particles as they pass through the sensing region, the detecting including capturing a light intensity signal included of multiple pulses above a threshold level, each pulse including an indication of light scattered by one or more particles; counting distinct pulses during a measurement period, each distinct pulse the signal crossing from below the threshold level to above the threshold level, the counting providing a measured count rate; measuring a measured live time fraction over the measurement period, the measured live time fraction including a proportion of the time the signal is below the threshold level; and calculating a coincidence-corrected rate of particles passing through the sensing region by dividing the measured count rate by a quantity including the measured live time fraction minus a constant multiplied by the measured count rate, where the constant has the units of time; and outputting a particle concentration based on coincidence-corrected value for the number of particles and the rate at volumetric rate of gas or liquid flow through the sensing region during the measurement period.

Implementations may include the method where the value of the constant is determined by experiments in which data are collected over a range of particle concentrations with a pair of instruments, one of which acts as a reference. Implementations may further include the method in which the reference instrument is operated at a constant dilution factor. Implementations of the described techniques may include hardware, a method or process, or computer software on a computer-accessible medium.

A further general aspect includes a method for determining the number concentration of particles suspended in a gas or liquid by: directing a flow of gas or liquid containing particles through a sensing region illuminated by a light source; detecting light scattered by the particles as they pass through the sensing region, the detecting including capturing a light intensity signal included of multiple pulses above a threshold level, each pulse including an indication of light scattered by one or more particles; counting distinct pulses during a measurement period, each distinct pulse the signal crossing from below the threshold level to above the threshold level, the counting providing a particle count rate per unit time; measuring a measured live time fraction over the measurement period, the measured live time fraction including a proportion of the time the signal is below the threshold level; calculating a coincidence-corrected particle count rate per unit time passing through the sensing region during the measurement period by dividing particle count rate per unit time by a quantity including the measured live time fraction minus a variable multiplied by the measured count rate, where the variable has the units of time and depends on the measured live time; and outputting a particle concentration based on the corrected particle count rate per unit time and the rate at volumetric rate of gas or liquid flow through the sensing region during the measurement period.

Implementations may include the method where the value of the constant is determined by experiments in which data are collected over a range of particle concentrations with a pair of instruments, one of which acts as a reference. Implementations may further include the method wherein in which the reference instrument is operated at a constant dilution factor.

BRIEF DESCRIPTION OF THE DRAWINGS

Embodiments of the present technology relating to both structure and method of operation may best be understood by referring to the following description and accompanying drawings, in which similar reference characters denote similar elements throughout the several views:

FIG. 3b is a graph of the model results for the measured live time as a function of input particle rate for DC coupled pulse train of FIG. 3a.

FIG. 3c is a graph of the model results for the indicated particle rate derived by a first order live time correction given by equation 7 for DC coupled pulse train of FIG. 3a.

FIG. 4a is a graph of the model results for the count rate as a function of input particle rate for AC coupled pulse train with a threshold of 20% of the typical single-particle pulse height.

FIG. 4b is a graph of the model results for the measured live time as a function of input particle rate for AC coupled pulse train of FIG. 4a.

FIG. 4c is a graph of the model results for the indicated particle rate derived by a first order live time correction given by equation 7 for AC coupled pulse train of FIG. 4a.

FIG. 5b is a graph of the model results for the Count-rate Coincidence Corrected and measured live time as a function of input particle rate for DC coupled pulse train of FIG. 5a.

FIG. 5c is a graph of the model results for the indicated particle rate derived by a Count-rate Coincidence Correction for DC coupled pulse train of FIG. 5a.

DETAILED DESCRIPTION

Technology is presented providing an approach for counting particles by providing a new method for correcting coincidence in particle counting systems. The technology is applicable to instruments that both count the number of distinct pulses and measure the time that the optical signal is below the preselected threshold value. The technology provides a more accurate determination of particle concentration in a volume of gas or liquid by flowing the gas or liquid through an illuminated "sensing region" and detecting pulses in a signal indicating the presence of particle by a change in signal amplitude during a total measurement period. Pulses are detected during a live time when the signal is below a threshold amplitude and moves above the threshold amplitude. This movement above the threshold creates a dead time during which only one pulse is detected until the signal amplitude moves sufficiently below the threshold such that a subsequent particle creates a distinct pulse. After counting the number of pulses, and determining the measured live time that the signal is below the threshold value, an initial particle concentration is calculated, and the calculation corrected for coincidence by calculating an actual live time as a measured live time minus a constant multiplied by the number of distinctly counted pulses, where the constant has the units of time.

Figure 1A:
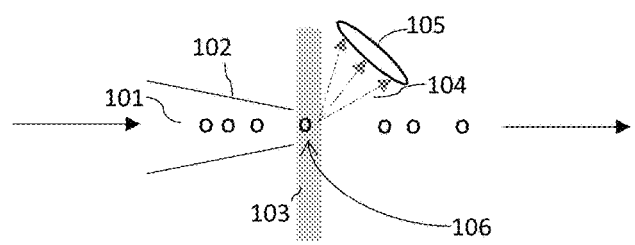
FIG. 1a is a depiction of a typical apparatus for optical detection of particles suspended in a flow, wherein, for illustrative purposes, the particles are shown greatly enlarged.

Generally, in instruments that detect and count individual airborne particles by optical means, the particle laden air flow is caused to pass through a focused light beam, such that the particles within the flow scatter light onto a detection system. FIG. 1a illustrates a typical apparatus for detecting and counting particles in suspended in a flow of gas or liquid. The flow containing the suspended particles 101 is directed through a nozzle 102, and crosses a focused beam of light 103. As a particle crosses through the light beam it scatters light 104, creating a pulse of light that is seen by the detector 105. The detector may include mirrors and focusing lenses as well as a photo-sensor, not shown in FIG. 1a. The spatial region 106 defined by the intersection of the light beam, and the region viewed by the photo-sensor, as defined by the detector lenses etc, is referred to as the "viewing" or "sensing region". The time duration of a pulse generated from a single particle depends on the flow velocity through the sensing region, and on the optical geometry, i.e., the thickness of the sensing region in the direction orthogonal to the flow.

Single particle counting systems are designed such that there is generally no more than one particle within the light beam at a time (i.e. the particles pass through the light beam one at a time). This creates a string of pulses, each one of which indicates the presence of a particle. However, at higher concentrations more than one particle can be present in the light beam, or sensing region, at a time, such that two or more particles create a single light pulse. In this instance, each pulse indicates the presence of one or more particles. This is referred to as coincidence.

Figure 1B:
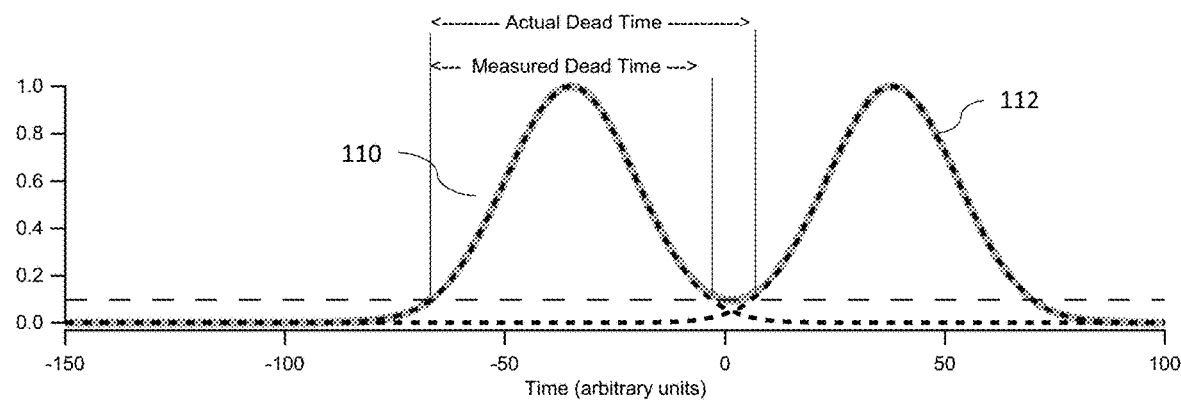
FIG. 1b is an illustration of measured and actual dead time for detection of two slightly separated particles or events, where the separation is the minimum that will create two distinct pulses.

These instruments generally count particles over a counting time period (also referred to as a total elapsed clock time or period). During this period the instrument may also determine the "measured live time", which is the interval of time when a pulse signal (from light scattered on particles in the sensing region) generates a reflection pulse that has a magnitude below a selected threshold The "measured dead time" is an interval when the amplitude of the signal is above a threshold and before it again passes below the threshold, and is equal to the total elapsed clock time minus the measured live time. The "actual dead time" is the time during which the instrument will not detect a new particle entering the sensing region due to the presence, or "coincidence" of another particle. The actual dead time is somewhat longer than the measured dead time, as illustrated in FIG. 1b, and described further below.

Coincidence corrections are often performed using dead-time corrections, in which the live time during which particles are counted is estimated as the total elapsed clock time minus the measured dead time. This measured dead time may be measured by current technologies, but the actual (or "effective") dead time is somewhat longer than this measured dead time because the addition of signal from the tails of the pulses under the threshold can push the signal above the threshold. FIG. 1b is an illustration of a measured and actual dead time for detection of two slightly separated particles or events, where the separation is the minimum that will create two distinct pulses.

This technology provides a method for correcting the measured dead time to give an actual dead time from which an accurate particle concentration can be calculated.

If the instances of two or more particles passing through the light beam at once (i.e. coincidence) are ignored, then the particle concentration is simply calculated as:

$$N = C_m/(q\Delta t) \quad (1)$$

where N is the particle concentration per unit volume of air; $C_m$ is the number of distinct pulses, or counts, detected in a time interval $\Delta t$; and q is the volumetric flow rate of the particle-laden gas or liquid. If particle concentrations are sufficiently high, the probability of more than one particle passing through the light beam at once is significant, and equation (1) underestimates the actual particle concentration. This phenomenon is commonly referred to as 'coincidence'.

Traditionally, coincidence corrections are treated using Poisson statistics, wherein the actual number of particles passing through the sensing region is estimated from the pulse count rate, and the single-event dead time, $\tau_1$. More specifically, the pulse count rate, $n_m$, is the number of distinctly detected pulses per unit time. The single event dead time, $\tau_1$, is the time required for a single particle to pass through the light beam. The actual particle count rate, $n_a$, defined as the actual number of particles passing through the light beam per unit time, is derived from Poisson's statistics in accordance with the formula:

$$n_m = C_m/\Delta t = n_a \exp(-\tau_1 n_a) \quad (2)$$

Although accurate, the Poisson's correction is difficult to apply in practice. The single event dead time, $\tau_1$, is not well known, as it depends on the width of the light beam at the transit point, system geometry, and flow rates. Additionally, the actual count rate, $n_a$, appears implicitly, and thus cannot be readily solved directly.

An alternate approach is to apply a "dead time" correction to the measured count rate. The "dead time", $t_{dead}$, is the total time during a counting interval of length $\Delta t$, in which the detector is busy, and thus blind to any new particle that may enter the light beam. The dead time correction calculates the effective count rate from the measured count rate divided by the Live Time fraction, $LF=1-t_{dead}/\Delta t$. For particle counters with a sampling volumetric flow rate q, the concentration of particles is related to the measured count rate $n_m$ by:

$$N = n_m/(qLF) \quad (3)$$

where: $LF = 1 - t_{dead}/\Delta t$ where N is the number of particles per unit volume of sample, LF is the fraction of the time that is "live", $t_{dead}$ is the dead time, and $\Delta t$ the elapsed time in the measurement interval. Dead-time corrected count rates using estimates of $t_{dead}$ are standard practice in pulse counting and are used in many commercial optical and condensation particle counters.

The challenge is in accurately estimating the actual dead time, $t_{dead}$, or alternatively, the actual Live Time Fraction, LF. From Poison's formulation, the live time fraction is $$LF = n_m/n_a = \exp(\tau_1 n_a) \quad (4)$$

As $n_a$ is not known, this is relationship is not directly calculable. Various formulations have been developed to evaluate equation (2), as it is not solvable in closed form. These include substituting $n_m$ for $n_a$ in the exponent, Taylor series expansion and application of the Lambert $W_1$ function.

A further complication is that pulse counting instruments must not only detect pulses, but must also exclude extraneous noise, and remain unaffected by small shifts in the baseline (where baseline is the signal level when no particles are present in the light beam, such as from dark current or stray light). Thus, pulse counting circuits always include a detection threshold, which is the level of the light scattering signal required to trigger a particle count. For practical reasons, this threshold is generally set at around 10-20% of the height of the pulse generated from a single particle passing through the light beam. The threshold excludes extraneous, small pulses due to noise, and accommodates slight shifts in the baseline so that only those signals due to the presence of a particle within the sensing region are detected. This widely implemented approach is necessary to ensure that the measured pulse counts result from the presence of a particle in the light beam. Yet it adds complexity to coincidence corrections.

FIG. 1b is an illustration of measured and actual dead time for detection of two slightly separated particles or events, 110 and 112 where the separation is the minimum that will create two distinct pulses. With modern electronics, it is possible to directly measure the time during which the light scattering signal is above the threshold for triggering the particle count (i.e. the measured dead time). This direct measurement is a good, but not a perfect, estimate of the actual dead time. Because the light scattering pulses are not square waves, but instead have more of a Gaussian shape, as illustrated in FIG. 1b, the actual dead time is slightly longer than what is measured. The overlap of tails of consecutive pulses can keep the light scattering signal above the threshold, leading to the two pulses being counted as one, as illustrated in FIG. 1b. More specifically, for symmetrically shaped pulses, the light scattering signal must drop to less than one-half of the threshold before an incoming pulse will be detected as distinct. The dead time that is measured is just the time that the detector is above its threshold, and thus is a slight underestimate of the actual dead time. Correspondingly, the measured live time fraction, is greater than the actual live time.

Figure 1C:
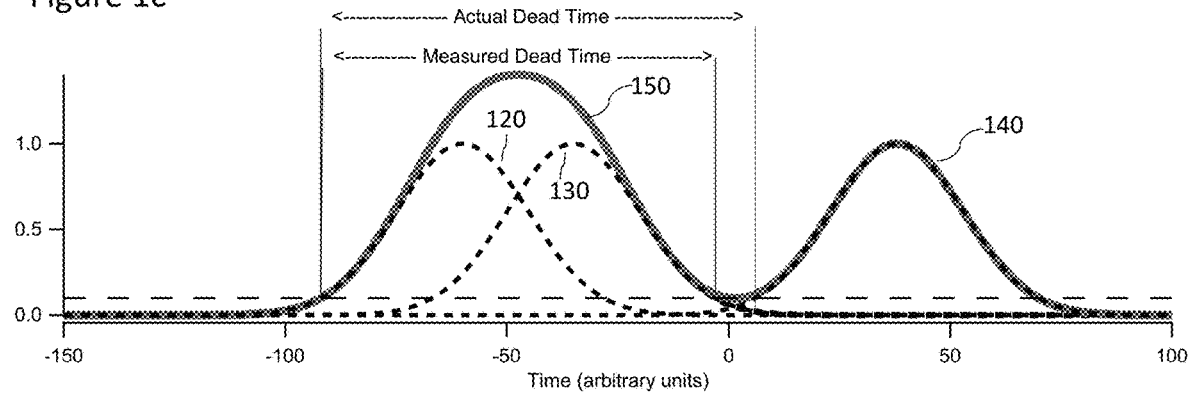
FIG. 1c is an illustration of measured and actual dead time for three particles, the first two of which are closely spaced and create a single light scattering pulse, and the third which is separated by just enough time to be seen as a separate pulse.

The technology utilizes a new method for coincidence correction, referred to as a "Count-rate Coincidence Correction" to improve particle counting accuracy. Particle counting using Count-rate Coincidence Correction estimates the actual live time by scaling the measured live time value in accordance with the measured count rate. The added time required for the light scattering to fall sufficiently below the threshold to enable detection of a new pulse should be, to first order, the same for all pulses, regardless of their length. In other words, if a string of coincident particles creates a long light scattering pulse, the time added to the measured dead time should be approximately the same as for a single-event pulse. It should not increase just because the pulse is longer. This is illustrated in FIG. 1c, which is an illustration of the measured and actual dead time for three particles, represented by pulse lines 120, 130, 140 the first two of which are closely spaced and are counted as a single light scattering pulse, and the third which is separated by just enough to be seen as a separate pulse.

Note that when two particles are coincident forming one pulse, the measured dead time increases, while the difference between the actual and measured dead times is approximately the same as following a single particle pulse, as shown in FIG. 1b.

The Count-rate Coincidence Correction calculates an estimated actual Live Time Fraction $LF_{est,\tau}$ by the formula:

$$LF_{est,\tau} = LF_m - \tau n_m \quad (5)$$

from which the coincidence corrected particle concentration is calculated:

$$N_{ind,\tau} = n_m/(q(LF_m - \tau n_m)) \text{ Count-rate Coincidence Correction} \quad (6a)$$

where $\tau$ is the mean time that must be added time to each detected pulse before the detector will see the next entering particle as a distinct event, and $n_m = C_m/\Delta t$ is the measured count rate of distinctly detected pulses. The parameter $\tau$ has the unit of seconds, and is evaluated empirically, either from experiments at high particle concentrations, or by inspection of the pulse shape. Physically, $\tau$ is twice the characteristic time for the trailing edge of the light pulse to drop to one-half of the threshold value. This is illustrated in FIG. 1b and FIG. 1c.

The Count rate Coincidence Correction to the indicated particle number concentration $N_{ind,\tau}$ can also be expressed in terms of the total number of distinct counts $C_m$ observed over a measurement period $\Delta t$, and the measured live time $LT_m$:

$$N_{ind,\tau} = C_m/(q\Delta t(LT_m - \tau C_m)) \text{ Count-rate Coincidence Correction} \quad (6b)$$

This expression is mathematically equivalent to equation (6a).

Count-rate Coincidence Correction has been so far presented as it applies to measuring a particle concentration in a gas or liquid. However, this method also applies to accurately counting the number of particles, or particles per unit time, that pass through the light beam. If the quantity of interest is the particle rate, $P_{ind}$, then this is directly calculated from the equations 6a or 6b by multiplying through by the flow rate q:

$$P_{ind} = qN_{ind,\tau} = C_m/(\Delta t(LT_m - C_m)) = n_m/(LF_m - \tau n_m) \quad (6c)$$

Particle counting using count-rate coincidence correction provides improved accuracy in particle counting relative to various prior approaches. Each of a number of such approaches was investigated using synthetic data, generated by superimposing the light scattering signals from a random sequence of particles passing through the sensing region, where the mean particle rate is varied (and where the sensing region is the intersection between the light source and collection optics). The model assumes that each particle generates a Gaussian shaped pulse, with 20% variation in height, and a fixed width at half maxima. Overlapping signals are superimposed.

Figure 2A:
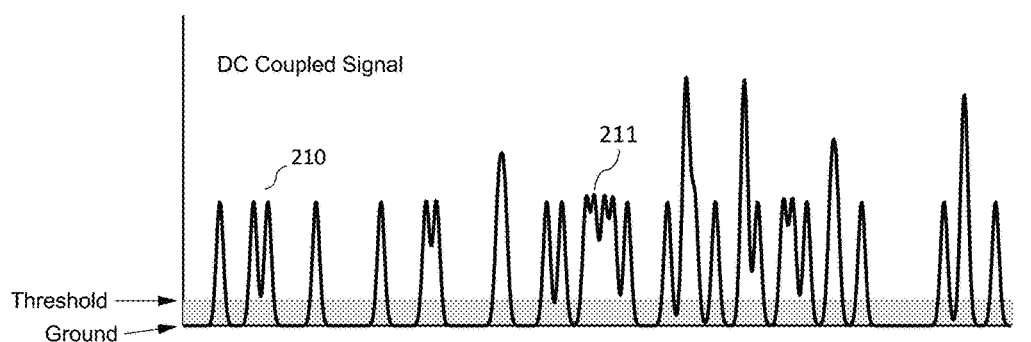
FIG. 2a is an example of the pulse train generated by a model for evaluating various methods for coincidence correction.

An example pulse train is shown in FIG. 2a. This signal is "DC" coupled; that is, the ground level corresponds to a total particle light signal of zero. The detection threshold is taken to be 20% of the nominal peak height. Pulses are detected only when the signal crosses the threshold from below. Closely spaced, multiple particle pulses in which the light signal does not drop below the threshold such as that indicated at 210 and 211, are counted as a single pulse. The data model captures the pulse rate, equal to the number of distinct pulses detected per unit time, as a function of the particle rate input into the model. The particle rate is the rate at which particles enter the sensing region of the instrument. The model also captures a 'measured dead time', defined as the time the signal is above the threshold value.

Figure 3A:
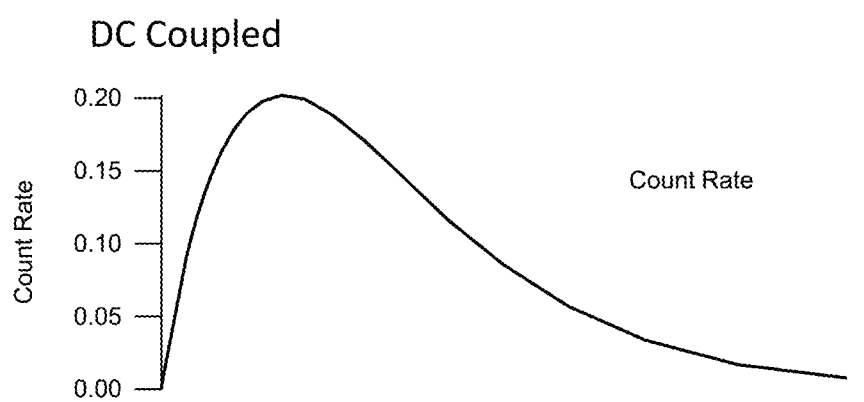
FIG. 3a is a graph of the model results for the count rate as a function of input particle rate for DC coupled pulse train with a threshold of 20% of the typical single-particle pulse height.
Figure 3B:
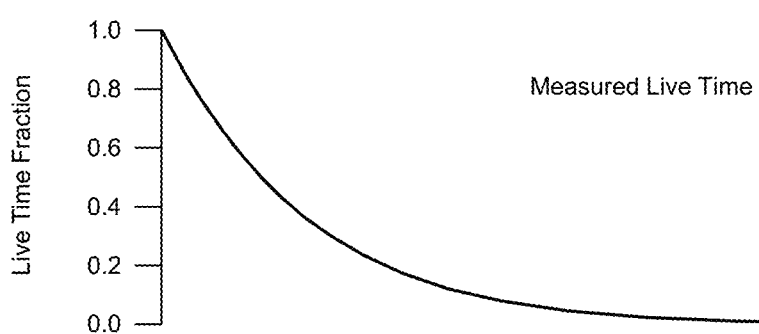

The limitations of using the measured dead time as a surrogate for the actual dead time $t_{dead}$ in calculating the particle concentration is illustrated in FIG. 3. In this analysis the time basis used to express the particle and pulse rates is the time equal to full width of the single particle Gaussian peak at half maxima (FWHM). For 1-μs FWHM pulses, this rate is simply the number of particles per μs. FIG. 3a shows the rate of distinctly detected pulses per unit time as a function of the rate at which particles entering the sensing region. When the particle rate is relatively low, the number of distinctly detected pulses per unit time increases with the particle rate. However, at high particle rates, above about 1 particle for every 2 FWHM units of time, the signal from the particles overlap to the extent that they become indistinct from one another, leading to a decrease in detectable pulses with increasing particle rates. FIG. 3b also shows the measured live time fraction, which is 1 minus the fraction of time the signal is above the threshold value. A first-order coincidence correction can be made to give an indicated particle number concentration ($N_{ind}$) by using the measured live time fraction as an estimate of the actual live time fraction in equation (3):

$$N_{ind} = n_m/(qLF_m)$$

$$LF_m = 1 - t_{dead,m}/\Delta t$$

first order, or measured live time, coincidence correction (7)

Figure 3C:
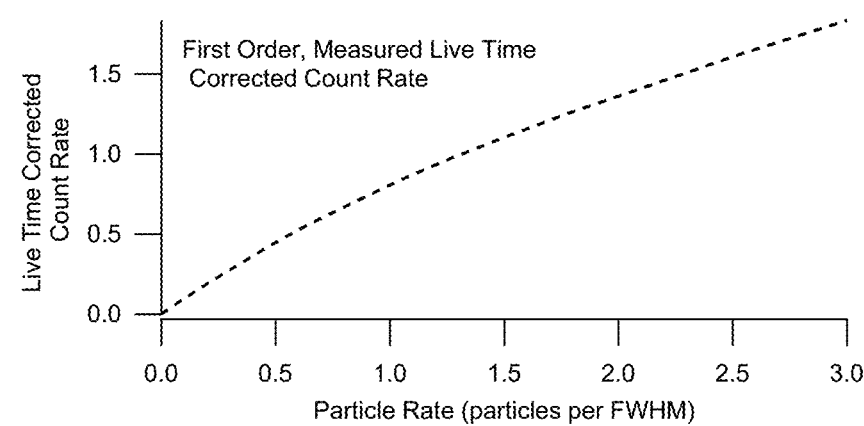

For this direct pulse analysis, the measured live time decreases monotonically with increasing particle rate. FIG. 3c shows the indicated particle count rate, as a function of the actual particle rate, calculated from equation (7) in which the measured Live Time Fraction, $LF_m$ is substituted for the actual Live Time Fraction, LF. As is apparent from the FIG. 3, using the measured value for Live Time Fraction in place of the actual value leads to indicated particle concentrations that are systematically low.

Figure 2B:
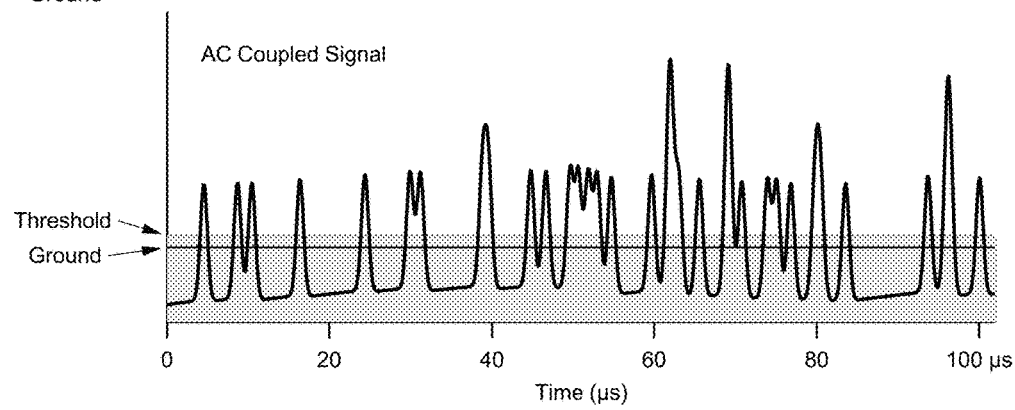
FIG. 2b is a graph of the same pulse train as FIG. 2b after AC coupling.

Another approach, also used in many commercial condensation particle counters, is AC coupling, wherein the only pulses that are counted are those that exceed the recent mean level by more than the preset threshold. This is accomplished using a high pass filter on the pulse train, such that only the high frequency fluctuations in captured light signal are detected as pulses. FIG. 2b shows the AC-coupled signal for the pulse train of FIG. 2a. With AC coupling, a portion of the signal is negative, yet the threshold is still a fixed value above ground. This approach has the advantage that, at low concentrations, the signal is insensitive to slow fluctuations in the background light level, and the threshold can be lower than for DC coupling. Yet, at higher concentrations, only the tops of the light scattering pulses are detected.

Whether analyzing DC signal, or the AC-coupled signal, only pulses above a threshold are counted. In both approaches, the measured live time fraction corresponds to the fraction of time that the signal is below the threshold. But with the AC-coupled signal, this threshold is considered with respect to the local average signal. At high particle rates, one only detects the larger pulses, and the number of distinct pulses detected tends to reach a plateau, as illustrated in FIG. 4a. Likewise, the measured live time, that is when the signal is below the threshold value, also reaches a plateau, as illustrated in FIG. 4b. As a result, the indicated particle concentrations, derived from the ratio of detected pulses to the measured live time fraction, equation (7), also tends to reach a plateau, as illustrated in FIG. 4c. Thus, like the DC method, errors increase at high particle rates.

Figure 5A:
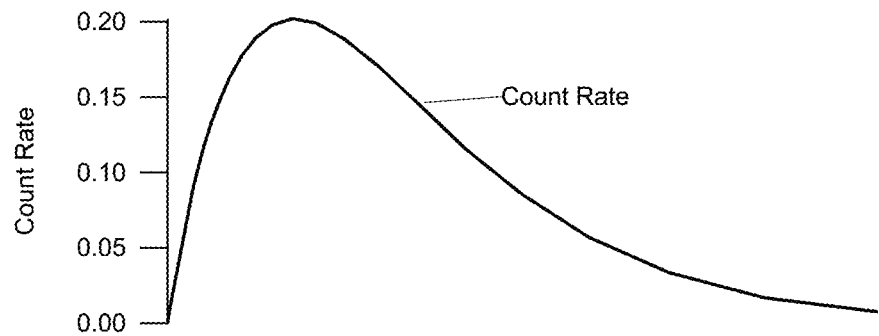
FIG. 5a is a graph of the model results for the count rate as a function of input particle rate for DC coupled pulse train with a threshold equal to 20% of the typical single-particle pulse height.
Figure 5B:
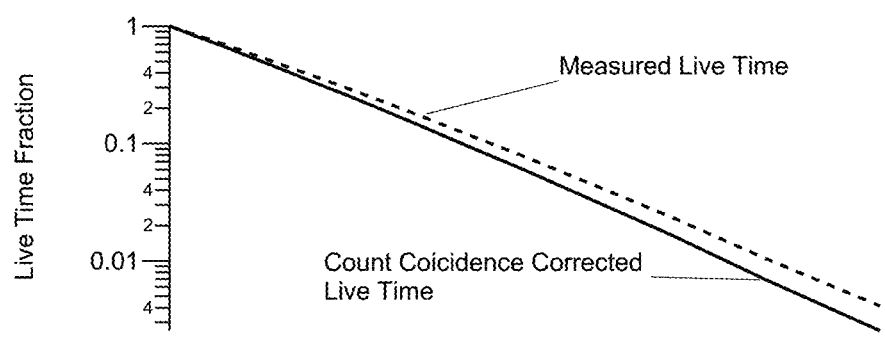
Figure 5C:
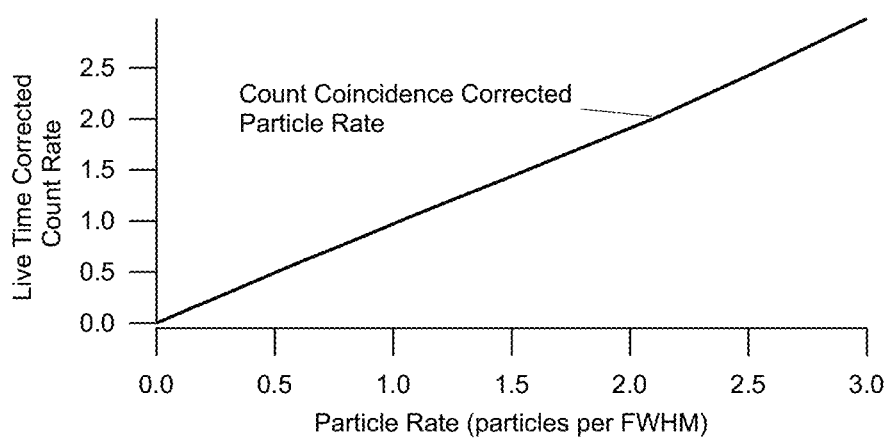

The effectiveness of the Count-rate coincidence Correction was evaluated using the same synthetic data set, generated by superimposing the light scattering signals from a random sequence of particles passing through the sensing region at various rates. The count rate, shown in FIG. 5a, is the same as that from the DC coupled results of FIG. 3a. The difference is in how the actual live time is estimated. In the first order live time correction, the measured live time is used as a surrogate for the actual live time. With the Count-rate Coincidence Correction the estimated value for the actual live time is smaller than the measured live time by an increment that is proportional to the number of detected pulses, as shown in FIG. 5b. Using this value to obtain the indicated particle rate, (equation (6a)) is much closer to the particle rate that is nearly linear with the particle rate used as input to the model, even at high particle rates that would have as many as 2 or more particles, on average, in the light beam at once (i.e., particle rates of 2 or more per FWHM). This is illustrated in FIG. 5c.

Figure 6:
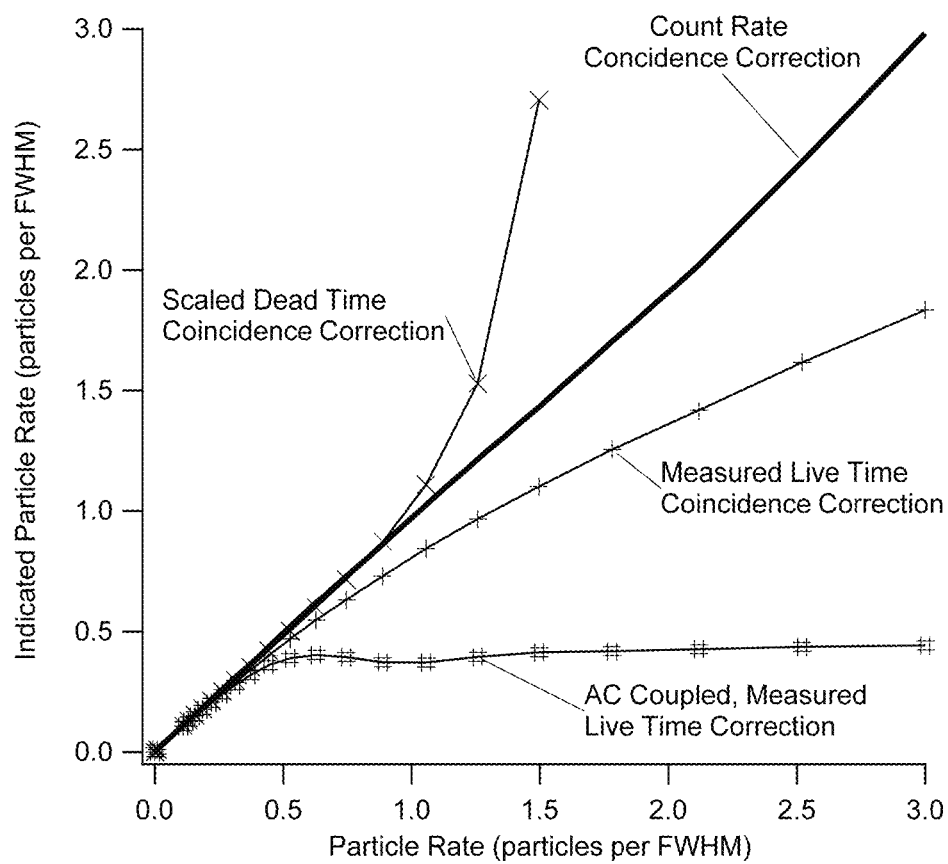
FIG. 6 is a graph of comparing the model results for the indicated particle rate derived from four different methods for coincidence correction, including the Count-rate Coincidence Correction of this invention.

FIG. 6 compares four approaches for coincidence correction for this synthetic data set. When the count rate is below about 0.4 particles per FWHM, each of these approaches yields a good estimate of the actual particle rate. At higher levels, live-time correction, whether AC or DC coupled, systematically underestimate the actual particle. The AC coupled live time correction plateaus to a nearly constant value for the indicated particle rates once the input actual particle rate exceeds 0.5 particles per FWHM.

FIG. 6 also shows dead-time scaling, which is the method formerly used in many the butanol and the water-based condensation particle counters sold by TSI Inc. (Shoreview, Minn.). With dead-time scaling the live time fraction is estimated from measured dead time fraction using the formula $LF_{est,f} = 1 - f\, t_{dead,m}/\Delta t$, where f is an empirically determined constant, referred to as the "dead time correction factor". Typically, f has a value between 1.02 and 1.1 (Hering, et al 2005). This approach is more accurate than the first order liver time correction of equation 7 in the mid-concentration range, up to 0.8 particles per FWHM. Yet at higher concentrations, this approach overcorrects the data, and indeed leads to negative values for the estimated value of the actual live.

Variations among data sets in the Count Coincidence Correction method was examined through model runs for multiple, independently generated sets of synthetic data. The length of each data set was selected to represent 1 sec of data for counters yielding pulses with FWHM=1 µs, as is typical of many condensation particle counters. As before, the model assumes that each particle generates a Gaussian shaped pulse, with 20% variation in height, and a fixed width at half maxima, wherein overlapping signals are superimposed. Results from each of these data sets are plotted in FIG. 7a. Here the indicated particle rate is shown as a function of the measured dead time fraction ($DF_m = t_{dead,m}/\Delta t = 1 - LT_m$). The Count-rate Coincidence Correction method yields indicated particle rates that are within 3% of the actual value over the range of up to 98% measured dead time. This corresponds to a particle rate of 2 particles per FWHM.

Figure 7A:
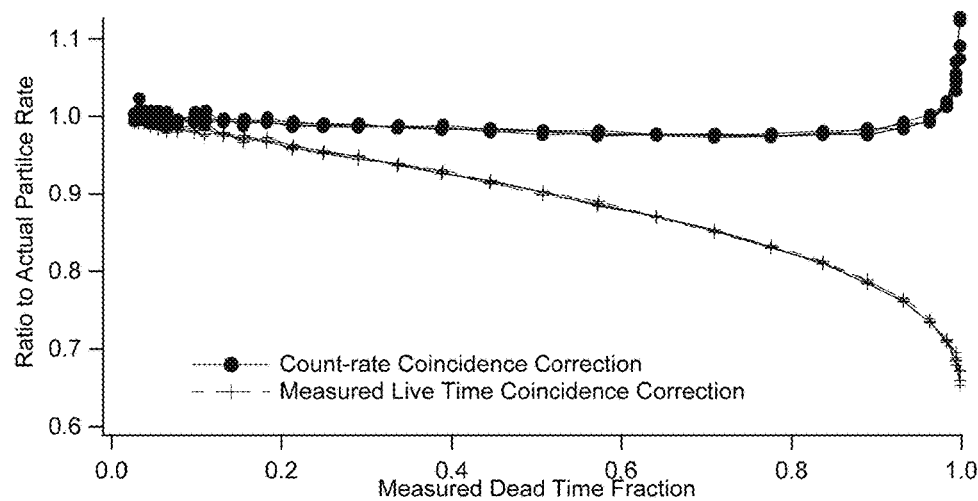
FIG. 7a is a graph of model results for the ratio of the indicated to the actual particle rates for Count-rate Coincidence Correction as a function of the measured dead time fraction, with comparison to results for first order measured live time correction.
Figure 7B:
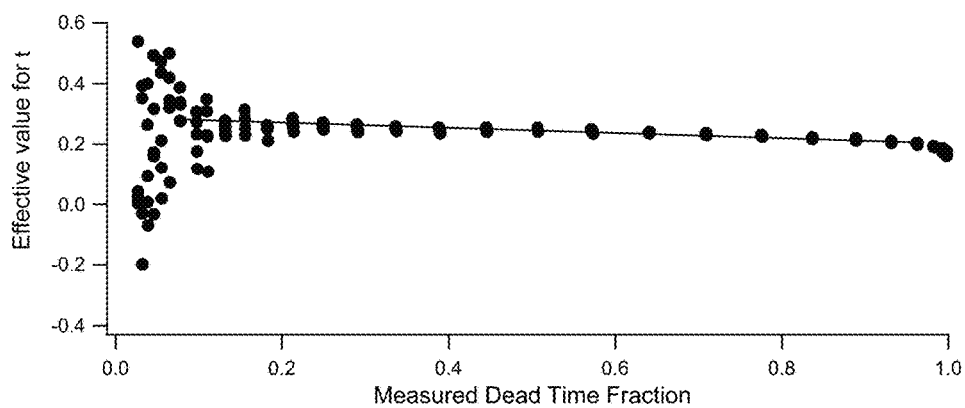
FIG. 7b is a graph of model results for the value of the parameter $\tau$ that yields the correct particle rate as a function of the measured dead time fraction.
Figure 7C:
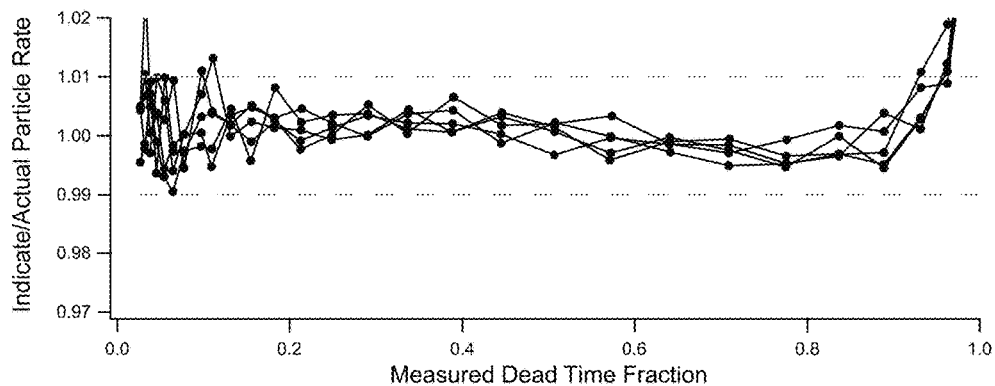
FIG. 7c is a graph of model results for the ratio of the indicated to actual particle rate where the indicated particle rate is calculated using a linear fit to the effective value for $\tau$ shown in FIG. 7b.

Close inspection of the results of FIG. 7a indicate a systematic deviation between the indicated and actual particle rate, where use of a constant value of τ throughout the entire range of dead times yields results that are 2% to 3% low in the mid-range of measured dead times. This is illustrated in FIG. 7b wherein the effective value of τ is shown as a function of the measured dead time fraction, calculated as $$\tau_e = \left[\frac{C_m}{P} - LF_m\right] / C_m,$$

where P is the actual particle rate. Because this is synthetic data, the actual particle rate is known, as it is an input parameter into the model. From this plot a linear fit of τ is generated as a function of the measured dead time fraction. In this example $\tau_e = 0.20 + 0.08\, LF_m = 0.28 - 0.08\, DT_m$. Using this expression for the value of τ in equation 6, a yet more accurate value for the indicated particle rate can be obtained, as shown in FIG. 7c. With this further correction the indicated particle rate is within 1% of the actual particle rate for measured dead time fraction from ~0 to 0.96. As the $LF_m$ is a directly measured quantity, this approach could be implemented if the two fit parameters can be evaluated. Yet, with experimental data, a single parameter fit, that is, with a constant value of τ, is as accurate as this two-parameter fit. While this example illustrates that further refinement in the coincidence correction based on the directly measured parameters is possible, experiments conducted with several condensation particle counters exhibited constant values for $\tau_e$, with no systematic dependence on the measured dead time. Thus Count-rate Coincidence corrections based on constant value for τ, in accordance with equation 6a, (or its mathematically equivalent formulations of 6b and 6c), was deemed best.

Figure 8:
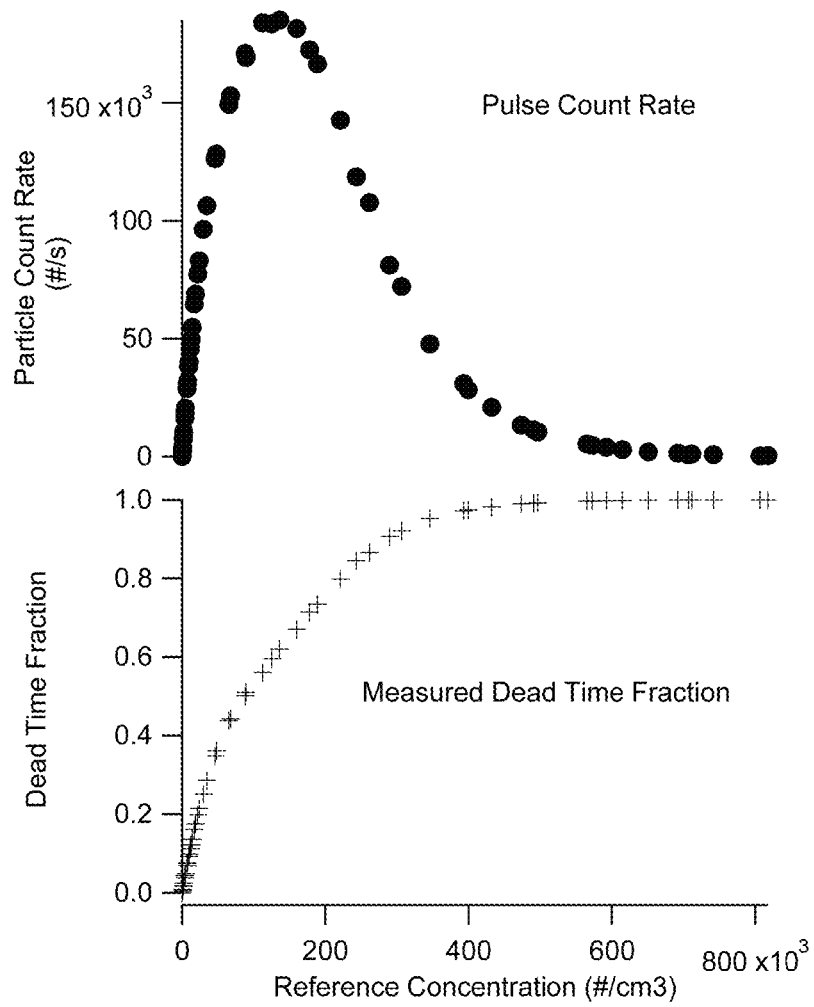
FIG. 8 is a graph of experimental data showing the measured count rate and measured dead time fraction as a function of input particle concentration, where the input particle concentration is measured by a reference system operated at a constant dilution factor.
Figure 9:
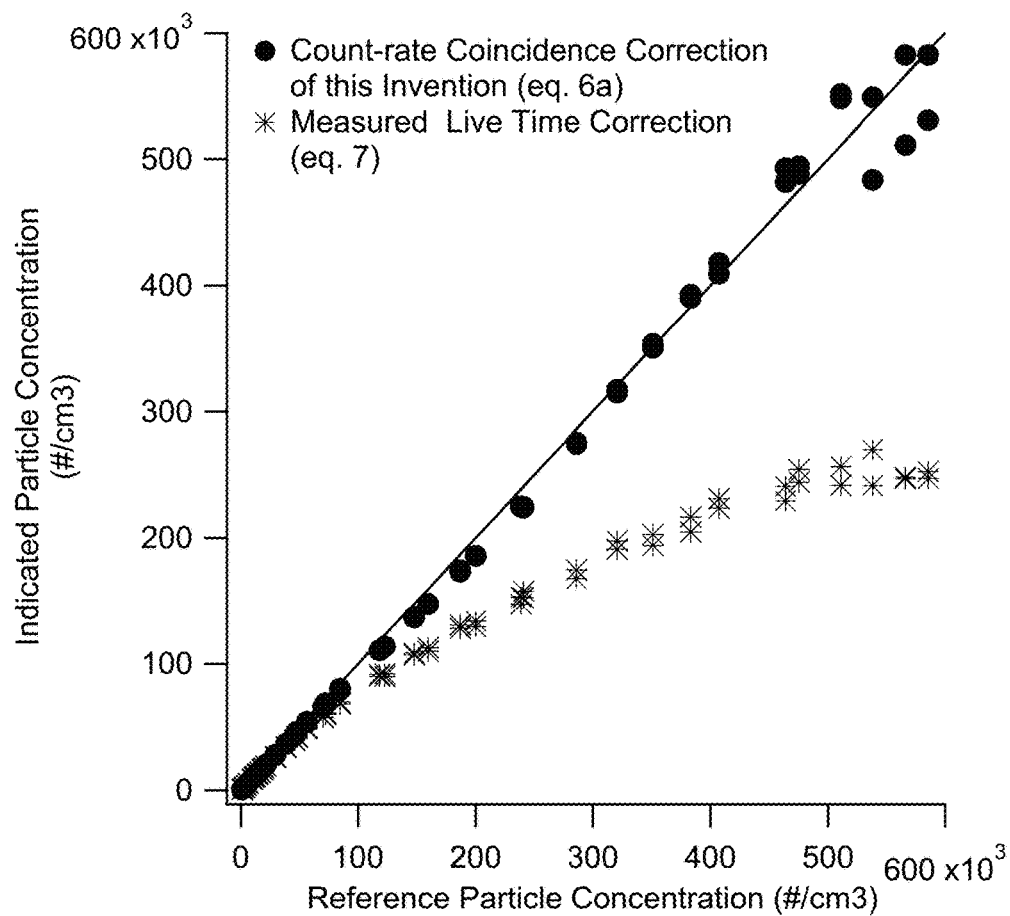
FIG. 9 is a graph of experimental data showing the indicated particle concentration calculated from the Count-rate Coincidence Corrected concentrations calculated from equation (6a) with $\tau$=0.23 μs, and from the first-order live time correction of equation (7), as function of input particle concentration measured by a reference system operated at a constant dilution factor.
Figure 10:
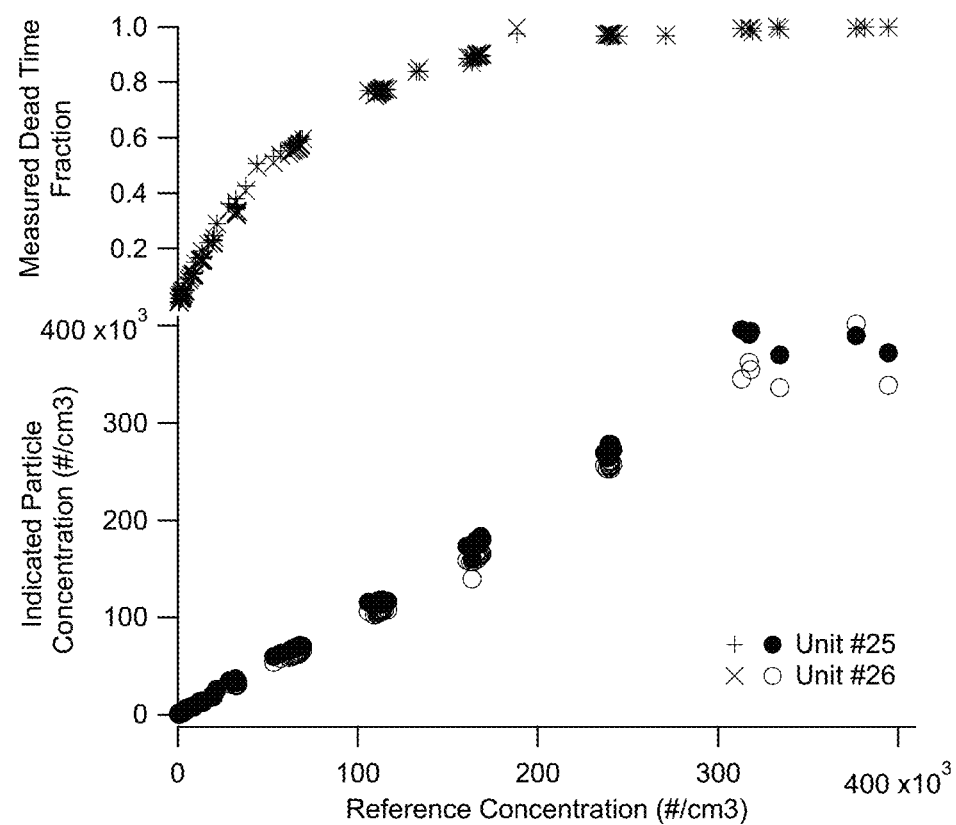
FIG. 10 is a graph of experimental data for a pair of condensation particle counters of the same design in which the indicated particle concentrations calculated from equation (6a) with $\tau$=0.23 μs.

FIGS. 8-10 show experimental data obtained over a wide range of particle concentrations. Measurements were conducted with a multiple condensation particle counters, one of which served as reference. The reference counter was operated at a fixed dilution. The particles were mono-mobility aerosols selected using a differential mobility size classifier. The dilution factor is determined by the ratio between the two counters at low concentrations, below $10^4/cm^3$.

FIG. 8 shows the count rate for one of the condensation particle counters, as a function of input particle concentration. At low to moderate concentrations, the count rate increases with increasing concentration. At high particle rates the pulse overlap dominates, and number of distinct counts decreases. This figure illustrates the importance of an accurate assessment of the actual live time. FIG. 8 also shows the corresponding measured dead time fraction ($DF_m$), defined as the fraction of the measurement interval during which the light scattering signal exceeds the threshold.

FIG. 9 shows the resulting particle concentrations calculated from equation (6a) with $\tau=0.23$ µs, determined from the fit to the data. Also shown is the value calculated from the uncorrected measured dead time ($\tau=0$). Using the measured dead time, with no correction, leads to consistent, but underestimated concentrations.

FIG. 10 shows results from a set of similar experiments for a pair of condensation particle counters of similar design. Both are corrected with $\tau=0.23$ µs. That the data from both units can be corrected with the same value for the empirical constant $\tau$ is reassuring. The absolute value of $\tau$ is of the order of 10% of the pulse width of a single event, measured at the threshold, which is the order of magnitude expected for the added dead time that might be expected due to for the signal to decay to from the threshold to one-half its value. FIG. 10 also shows the measured dead time for each of the two units. This reaches 95% at 260,000 particles/cm³ and is above 98% for the highest concentrations shown. Only at these highest concentrations do the data become somewhat scattered. These data show that the correction approach of the present technology is valid for dead times as high as 95%. As input parameters are directly measured, the approach of the present technology is readily calculable with a microprocessor.

Figure 11:
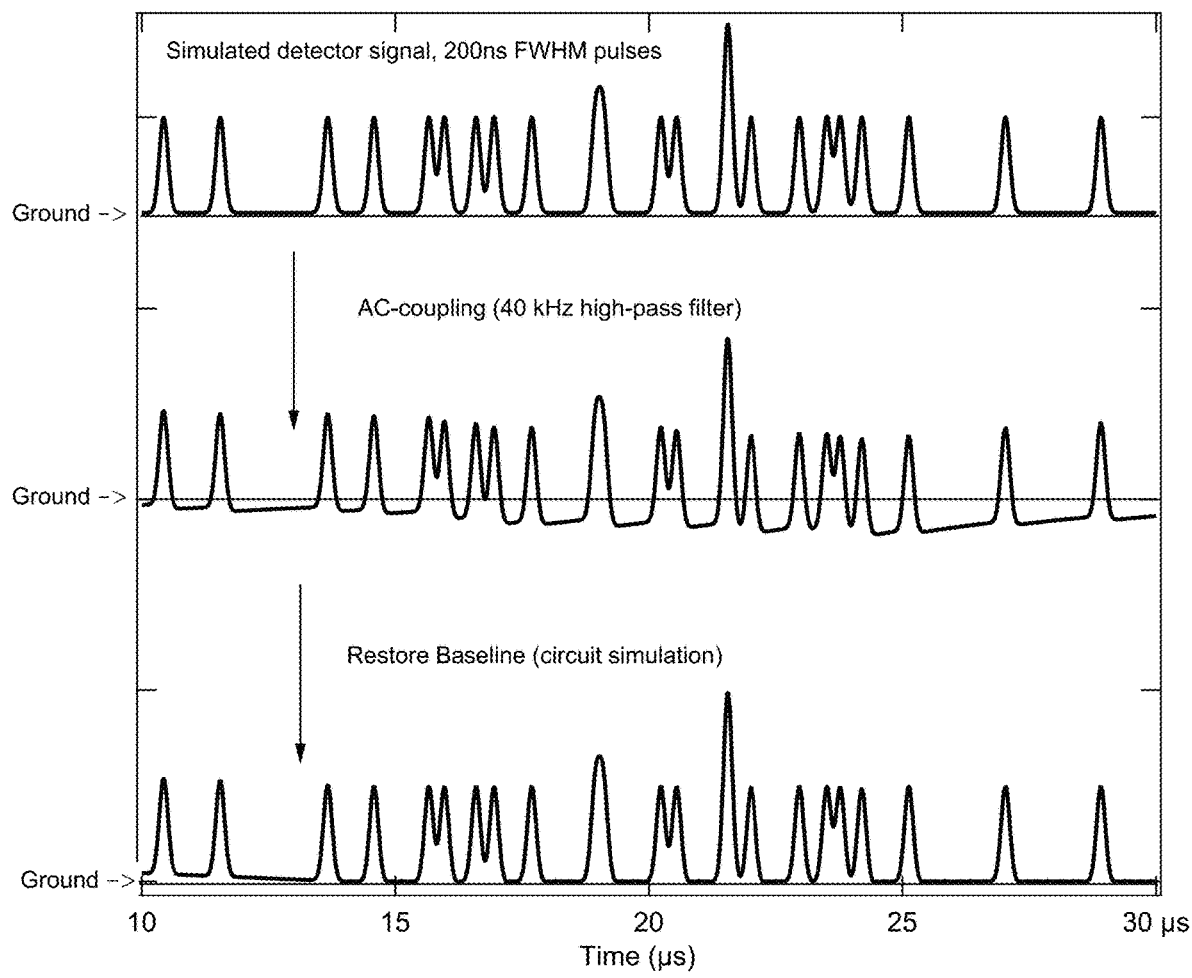
FIG. 11 is an illustration of how a DC pulse signal that is AC coupled and then processed with by circuitry to restore the baseline.
Figure 12:
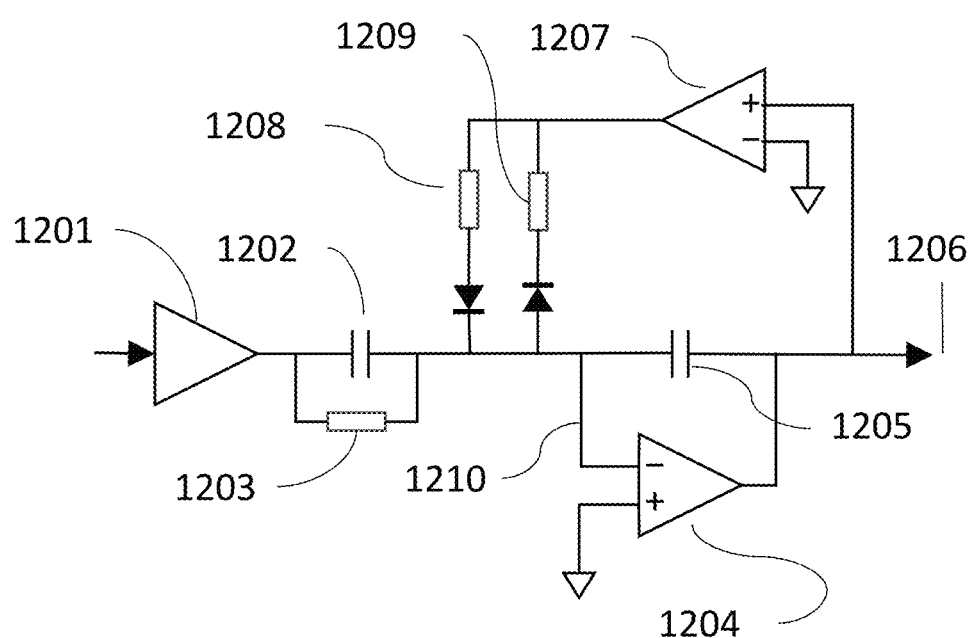
FIG. 12 is an example circuit that can be used to restore the baseline of the AC coupled pulse signal.

The Count-Rate Coincidence Correction method of the technology can also be applied to "baseline restored AC coupled" data. There are advantages to AC coupling, as it avoids amplifying DC offsets and background light. Yet, as illustrated above, the coincidence correction is quite limited compared to what is possible with DC coupling. "Baseline restored AC coupling", illustrated in FIG. 11, takes advantages of each of these approaches. Shown is the raw detector signal, simulated with pulses with a FWHM of 200 ns, its AC coupled signal obtained using a 40 kHz high-pass filter, and the baseline restored signal obtained by further processing the AC coupled signal such that the signal ground is restored to the local minimum in the signal. This restoration can be accomplished in hardware, with a circuit such as illustrated in FIG. 12. The baseline restored signal can then be processed using the Count-rate Coincidence Correction approach of the present technology.

FIG. 12 shows an electronic circuit to compensate for the effects of a high-pass filter on a signal, specifically a signal consisting of a series of positive-going pulses riding on a zero-voltage baseline. The undesired effects of the high-pass filter are the distortion of the signal shape and the loss of the baseline reference voltage. The distortion is eliminated by a filter comprised of the following components: inverter 1201, capacitor 1202 with value C, resistor 1203 with value R, capacitor 1205 with value CO, and operational amplifier 1204. The product RC is tuned to match the characteristic time constant of the high-pass filter. The value of C/CO sets the overall gain. Baseline restoration is accomplished by the comparator 1207, which either sources current $I_{droop}$ through the resistor-diode pair 1208 or sinks current $I_{lift}$ through resistor-diode pair 1209. The feedback action of op-amp 1204 causes the lift and droop currents to, respectively, add and remove charge on capacitor 1205, thus adjusting the offset of the recovered signal. By setting $I_{lift} \gg I_{droop}$ the output 1206 eventually equilibrates so that it spends a small but finite fraction—Idroop/Ilift—of its time below zero. This condition ensures that the baseline of the pulse train is at approximately zero volts. The functions described here can be implemented in other ways. For example, the linear recovery filter and the baseline restoration could be daisy-chained as separate circuits. Also, because the droop current is activated most of the time, it could be configured to operate continuously without significantly changing the behavior. Only the rapid lift current needs to act in short bursts. Once the baseline of the AC-coupled signal is restored, the particle concentrations may be evaluated using the Count-rate Coincidence Correction approach of the present technology, as described by equation 6a.

Figure 13:
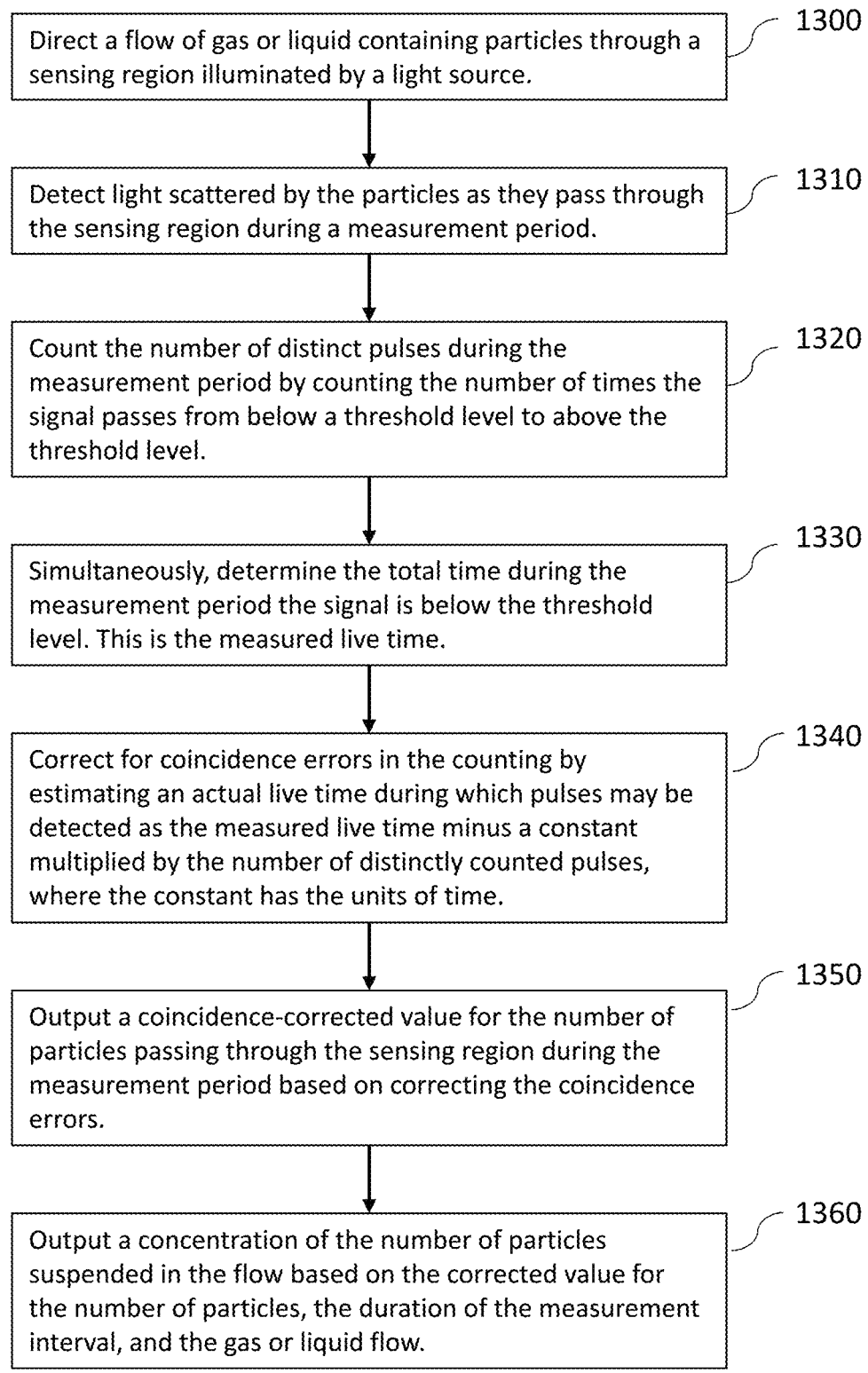
FIG. 13 is a flowchart illustrating a method in accordance with the present technology.

FIG. 13 illustrates a method in accordance with the present technology. At 1300, a flow containing suspended particles is introduced into a container having a sensing region that is illuminated using a light source. At 1310, light scattered from the particles passing through the sensing region is detected to create a signal during a measurement period. At 1320 pulses in the signal having an amplitude higher than a threshold level are detected during a total measurement period and a count of the number of distinct pulses is made wherein the count is incremented each time the signal crosses the threshold level from below. At 1330, during the same measurement period, the measurement is made of the "measured live time" equal to the total time during the measurement period that the level of the signal is below the threshold level. At 1340 the actual live time during which pulses can be detected is estimated as the measured live time minus a constant multiplied by the number of distinctly counted pulses, where the constant has the units of time. At 1350, a coincidence-corrected value for the total number of particles per unit time that passed through the sensing region during the measurement period is calculated using the ratio of the number of distinct pulses divided by the estimated actual live time. At 1360, a corrected particle concentration is provided based on the coincidence-corrected value for the total number of particles that passed through the sensing volume and the volume of gas or liquid flow that was directed through the sensing volume.

Figure 14:
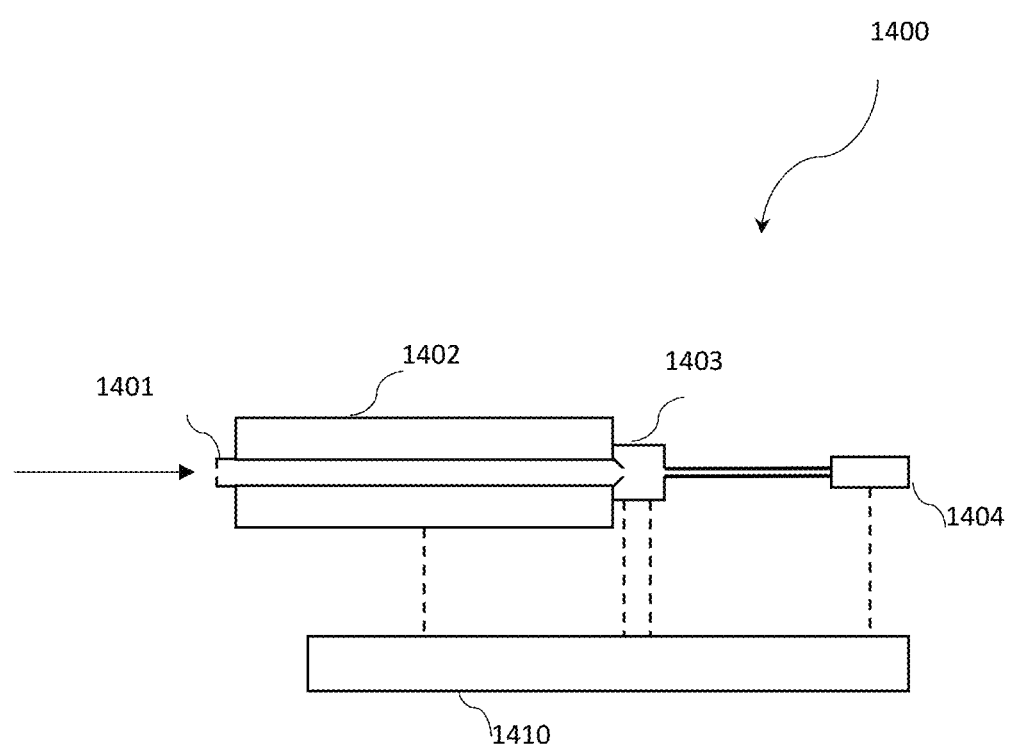
FIG. 14 is a block diagram of a condensation particle counter apparatus using the present technology.

FIG. 14 is an example apparatus utilizing Count-rate Coincidence Correction. The apparatus 1400 consists of an inlet 1401 where a sample of particle-laden air is introduced, a condensational growth tube 1402 for condensationally enlarging the particles from diameters as small as a few nanometers to micrometer sizes, an optical system 1403 to detect the condensationally enlarged particles, and a flow sensor and pump 1404 for exhausting the air sample. The controller 1410 controls the pumps, system temperatures, the light source, and photo-detector, and processes the signals from the optical system. The signal may be DC coupled, or it may provide a baseline-restored AC coupled signal. In either case, the signal processing records values over each measurement period: (1) it counts the number of pulses as the signal passes from below the threshold level to above the threshold and (2) it records a measured dead time (or live time) fraction equal to the time the signal is above (or below), the threshold. Generally, each time the analogue signal produces a count, a digital, square wave signal is produced which is then counting electronically. The measured dead (or live) time fraction is determined by periodically sampling the digital signal, and recording the fraction of samples that are high (or low). The value for these two signals over each measurement period is combined with the measured air sampling flow rate to calculate the number concentration of particles in the flow in accordance with equation 6a (or it mathematically equivalent form 6b).

The controller may be configured to perform the methods described herein and may comprise any of a general-purpose network component or computer system which includes a processor (which may be referred to as a central processor unit or CPU) that is in communication with memory. The processor may comprise multiple processors implemented as one or more CPU chips, cores (e.g., a multi-core processor), FPGAs, ASICs, and/or DSPs, and/or may be part of one or more ASICs. The controller may be configured to implement any of the schemes described herein. The processor may be implemented using hardware, software, or both.

In summary, the Count-rate Coincidence correction of the technology provides accurate particle counting to much higher levels of dead time than previous methods. Specifically, it is demonstrated through modeling and experiment errors of less than a few percent in the indicated particle count rate for measured dead times as high as 98%. Our Count-rate Coincidence correction method is also easily implemented, as its approach is to estimate the actual live time from the measured live time fraction and measured count rate by simply subtracting from the measured live time fraction the measured count rate multiplied by a constant value $\tau$, where $\tau$ is an empirically determined constant that approximates twice the time required for the signal to drop from the threshold level to one half the threshold level. The Count-rate Coincidence correction may be implemented with DC coupled signals, or with a baseline-restored, AC coupled signal.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, it is noted that the term "based on" as used herein, unless stated otherwise, should be interpreted as meaning based at least in part on, meaning there can be one or more additional factors upon which a decision or the like is made. For example, if a decision is based on the results of a comparison, that decision can also be based on one or more other factors in addition to being based on results of the comparison.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps shown in FIG. 13.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the embodiments of the present technology without departing from its scope. While the dimensions, types of materials and coatings described herein are intended to define the parameters of the embodiments of the present technology, they are by no means limiting and are exemplary embodiments. Many other embodiments will be apparent to those of skill in the art upon reviewing the above description. The scope of the embodiments of the present technology should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A method for detecting particles, comprising:
    directing a flow of gas or liquid containing particles through a sensing region illuminated by a light source;
    detecting light scattered by the particles as they pass through the sensing region, the detecting comprising capturing a light intensity signal comprised of multiple pulses above a threshold level, each pulse comprising in indication of light scattered by one or more particles;
    counting distinct pulses during a measurement period, each distinct pulse the signal crossing from below the threshold level to above the threshold level;
    measuring a measured live time over the measurement period, the measured live time comprising a length of time the signal is below the threshold level; and
    outputting a coincidence-corrected value comprising a number of particles that passed through the sensing region during the measurement period, the coincidence-corrected value calculated by dividing a number of distinct pulses counted by a first quantity, the first quantity comprising the measured live time, minus a second quantity, the second quantity comprising a constant multiplied by the number of distinctly counted pulses, where the constant is determined by comparing the number of distinct pulses against a number of distinct pulses in a known concentration to derive a mean time period added to each distinct pulse before detecting a next particle as a distinct event and has the units of time.

2. The method of claim 1 further comprising outputting a particle concentration based on coincidence-corrected value for the number of particles and the volume of air that passed through the sensing region during the measurement period.

3. The method of claim 1 wherein the value of the constant is determined by experiments in which data are collected over a range of particle concentrations with a pair of instruments, one of which acts as a reference.

4. The method of claim 3 in which the reference instrument is operated at a constant dilution factor.

5. The method of claim 1 wherein the signal is DC coupled and ground indicates no detected illumination.

6. The method of claim 1 wherein the signal is AC coupled and a portion of the signal is negative.

7. The method of claim 6 wherein the signal is a baseline-restored AC coupled signal.

8. A method for determining the number concentration of particles suspended in a gas or liquid by:
  directing a flow of gas or liquid containing particles through a sensing region illuminated by a light source;
  detecting light scattered by the particles as they pass through the sensing region, the detecting comprising capturing a light intensity signal comprised of multiple pulses above a threshold level, each pulse comprising an indication of light scattered by one or more particles;
  counting distinct pulses during a measurement period, each distinct pulse the signal crossing from below the threshold level to above the threshold level, the counting providing a measured count rate;
  measuring a measured live time fraction over the measurement period, the measured live time fraction comprising a proportion of the time the signal is below the threshold level; and
  calculating a coincidence-corrected rate of particles passing through the sensing region by dividing the measured count rate by a first quantity, the first quantity comprising the measured live time fraction minus a second quantity, the second quantity comprising a constant multiplied by the measured count rate, where the constant is determined by comparing the number of distinct pulses against a number of distinct pulses in a known concentration to derive a mean time period added to each distinct pulse before detecting a next particle as a distinct event and has the units of time; and
  outputting a particle concentration based on coincidence-corrected value for the number of particles and the rate at volumetric rate of gas or liquid flow through the sensing region during the measurement period.

9. The method of claim 5 wherein the value of the constant is determined by experiments in which data are collected over a range of particle concentrations with a pair of instruments, one of which acts as a reference.

10. The method of claim 6 in which the reference instrument is operated at a constant dilution factor.

11. A method for determining the number concentration of particles suspended in a gas or liquid by:
  directing a flow of gas or liquid containing particles through a sensing region illuminated by a light source;
  detecting light scattered by the particles as they pass through the sensing region, the detecting comprising capturing a light intensity signal comprised of multiple pulses above a threshold level, each pulse comprising an indication of light scattered by one or more particles;
  counting distinct pulses during a measurement period, each distinct pulse the signal crossing from below the threshold level to above the threshold level, the counting providing a particle count rate per unit time;
  measuring a measured live time fraction over the measurement period, the measured live time fraction comprising a proportion of the time the signal is below the threshold level;
  calculating a coincidence-corrected particle count rate per unit time passing through the sensing region during the measurement period, the coincidence-corrected count rate calculated by dividing a particle count rate per unit time by a first quantity, the first quantity comprising the measured live time fraction minus a second quantity, the second quantity comprising a variable multiplied by the measured count rate, where the variable is determined by comparing the number of distinct pulses against a number of distinct pulses in a known concentration to derive a mean time period added to each distinct pulse before detecting a next particle as a distinct event and has the units of time and depends on the measured live time; and
  outputting a particle concentration based on the corrected particle count rate per unit time and the rate at volumetric rate of gas or liquid flow through the sensing region during the measurement period.

12. The method of claim 11 wherein the value of the constant is determined by experiments in which data are collected over a range of particle concentrations with a pair of instruments, one of which acts as a reference.

13. The method of claim 12 in which the reference instrument is operated at a constant dilution factor.

14. The method of claim 11 wherein the signal is DC coupled and ground indicates no detected illumination.

15. The method of claim 11 wherein the signal is AC coupled and a portion of the signal is negative.

16. The method of claim 15 wherein the signal is a baseline-restored AC coupled signal.

17. An apparatus, comprising:
  a sensing volume adapted to receive a flow of gas or liquid containing particles
  a light source positioned to illuminate the light source;
  a detector positioned adjacent to the sensing volume and capable of detecting light scattered by particles as they pass through the sensing volume, the detecting configured to capture a light intensity signal comprised of multiple pulses above a threshold level, each pulse comprising in indication of light scattered by one or more particles;
  a controller, the controller configured to process instructions to:
  count distinct pulses during a measurement period, each distinct pulse the signal crossing from below the threshold level to above the threshold level;
  measure a measured live time over the measurement period, the measured live time comprising a length of time the signal is below the threshold level; and
  output a coincidence-corrected value comprising number of particles that passed through the sensing region during the measurement period, the coincidence-corrected value calculated by dividing a number of distinct pulses counted by a first quantity, the first quantity comprising the measured live time minus a second quantity, the second quantity comprising a constant multiplied by the number of distinctly counted pulses, where the constant is determined by comparing the number of distinct pulses against a number of distinct pulses in a known concentration to derive a mean time period added to each distinct pulse before detecting a next particle as a distinct event and has the units of time.

18. The apparatus of claim 17 wherein the controller is further configured output a particle concentration based on coincidence-corrected value for the number of particles and the volume of air that passed through the sensing region during the measurement period.

19. The method of claim 1 wherein the constant is determined through experimental comparison to a reference counter over a range of particle concentrations.

20. The method of claim 1 further including calculating a particle concentration equal to the coincidence-corrected value for the rate at which particles pass through the sensing region divided by a flow rate, the flow rate comprising a rate at which gas or liquid passes through the sensing region.

* * * * *